PRIOR ART

Dec. 14, 1965 J. B. COULTER, JR., ETAL 3,223,188
ROLLER CONE ROCK BIT
Filed Oct. 26, 1962 6 Sheets-Sheet 3

PRIOR ART

PRIOR ART

United States Patent Office 3,223,188
Patented Dec. 14, 1965

3,223,188
ROLLER CONE ROCK BIT
John B. Coulter, Jr., and James B. Steen, Fort Worth, Tex., assignors to Chicago Pneumatic Tool Company, New York, N.Y., a corporation of New Jersey
Filed Oct. 26, 1962, Ser. No. 233,219
7 Claims. (Cl. 175—341)

This invention relates to rotary roller rock bits for deep well drilling and particularly to the shape of the teeth on the cutters or cones which operate on the earth formation with an approximately true rolling action.

The usual cone type rock bit comprises three conical cutters each having widely spaced circumferential rows of teeth offset in relation to the corresponding rows on the other cones to drill the formation at the bottom of the hole, the particles of detritus thus dislodged being removed by the action of a liquid flushing fluid or of pressurized air or gas. Cone bits in common use have various shapes of teeth which may be classified as falling into three general types. The type first developed is known as the chisel tooth, which is exemplified by Scott et al. Patent 1,983,316, December 4, 1934. The chisel tooth is characterized by a sharp cutting edge or crest which extends radially of the cone from one circumferential groove to the next, the flanks of the teeth being separated from adjacent teeth in the same circumferential row by means of deep radial grooves, which act to receive the loosened earth formation and permit deep penetration of the teeth. In extremely hard and abrasive formations such as quartzite, granite and flint, the chisel toothed cone will not drill effectively.

The second type of tooth, which is designed specially for such extremely hard formations, is known as the inserted plug type, in which the teeth consist of plugs of hard metal such as tungsten carbide, which are inserted into holes in the surface of the steel cone, each insert having an ovoid portion projecting outside the cone surface. The blunt areas of the plugs engage the earth formation with a crushing action and thus fracture the hard rock formation rather than chisel it. The inserted plug type is exemplified by Morlan et al. Patent 2,687,875, August 31, 1954.

The inserted plug type of tooth has a disadvantage in that the cost of manufacture of the cone is about five times that of a chisel tooth cone. A further disadvantage of the inserted plug cone bit is that it loses much of its drilling effectiveness when it reaches the end of an extremely hard formation for which it was designed and encounters softer formation. This is due to the fact that the projecting portion of the tungsten carbide plug, being in the shape of a hemisphere, is necessarily very short and does not have the penetrating action required for softer formations.

A third type of tooth, which combines the advantages of both of the first two types, is disclosed in Coulter Patent 2,927,778, March 8, 1960. In this type the teeth are made of steel which is machined from the integral body of the cone and each tooth has an ovoid tip corresponding to the inserted plug, and in addition a root which spaces the tip from the body of the cone and performs the function of the root of the chisel tooth.

The general object of this invention is to improve upon the shape of the teeth in the third type, while retaining all of the advantages asserted in the Coulter patent.

Another object is to increase the penetrating effect of the teeth in medium formations.

A further object is to strengthen the tooth and make it more resistant to fracture, chipping and wear.

A still further object of the invention is to provide a smooth cutting surface on the cone, devoid of sharp corners.

Still another object is to enable the cutting surface of the cone to be case hardened to a greater degree and depth, thus prolonging the life of the rock bit.

A feature of this invention is a tooth which is circular in every plane of cross section, not only in the tip but also in the root. More specifically, the root has the shape of a cone which is integrally joined to a hemispherical tip.

Other objects and features of the invention will appear from the description which follows:

In the accompanying drawings which illustrate a preferred embodiment of the invention and preferred method of manufacturing the same:

FIGS. 1, 11 and 12 are drawn to the same scale; FIGS. 3, 4, 5 and 13–19 to a larger scale; and FIGS. 6–10 to a still larger scale.

Figure 1:
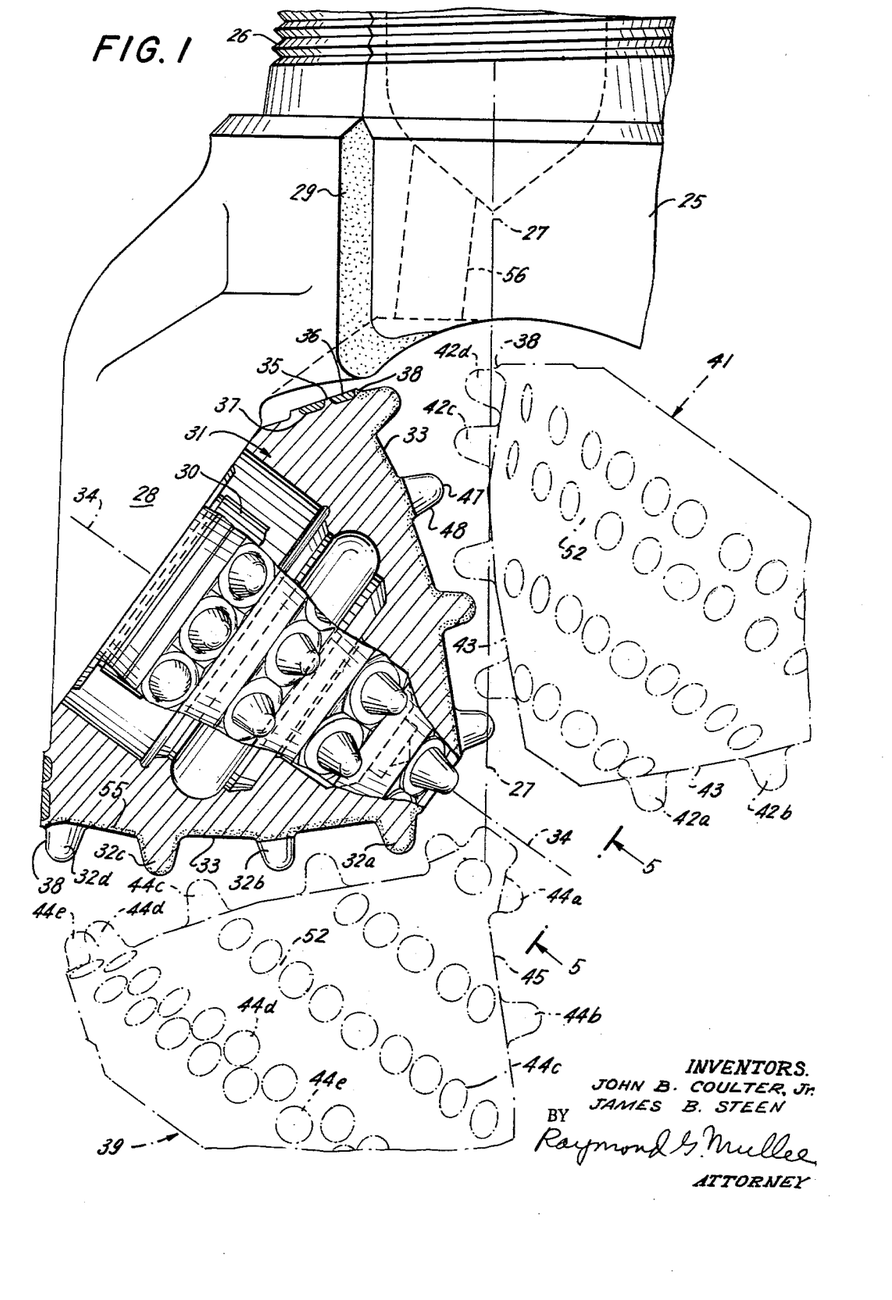
FIG. 1 is a fragmentary view of a three cone rock bit showing one of the cone cutters chiefly in longitudinal section, with a part of the cone and a part of the bit head in side elevation, and also showing in phantom lines the other two cones with their teeth in interfitting relation to those of the illustrated cone.

Referring to FIG. 1, a bit head 25 of the usual form is provided with a threaded shank 26 for attachment to the lower end of a drill collar (not shown), whereby the bit head may be rotated about the vertical axis 27 of the bore hole. The bit head has three equidistant legs 28 (one shown) extending downwardly and outwardly. Each leg is integral with an associated segment, the three segments being secured to each other by welding material 29. Each leg 28 supports, near its lower end, a spindle 30 which extends downwardly and inwardly. The illustrated spindle provides a support for a cone cutter 31. Suitable rolling and friction bearings (not shown) are interposed between the cone and the spindle according to the usual well known arrangement. The cutting surface of the cone 31 comprises a series of circumferentially extending rows of teeth 32a, 32b, 32c and 32d of novel formation, separated by wide and deep circumferential grooves 33.

The cone cutter 31 is suitably contoured and mounted to operate on the bottom of the bore hole with an approximately true-rolling action. To this end, the spindle 30 is arranged with its axis 34 in the same vertical plane as the vertical axis 27 of revolution of the bit head, and the cone cutter 31 is positioned with its apex adjacent said vertical axis. The teeth 32 (a, b, c and d) are all approximately the same in size and shape, and the first three rows 32 (a, b and c) are so designed that the diameter of each circumferential row is approximately proportional to the distance of the row from the vertical axis 27, such distance being measured radially along the bottom of the bore hole. The outermost row 32d, adjacent the heel of the cone, is slightly reduced in diameter in relation to its radial distance from the center of the hole, with the result that the action of the heel row 32d on the earth formation is a combination of rolling and scraping. Revolution of the bit head 25 about the vertical axis 27 compels the cone 31 to rotate about the spindle axis 34 under the reactive force of the traction between the teeth 32 (a, b, c and d) and the bottom of the hole with the rows 32a, 32b and 32c dominating the roll of the cone. In general, the cone turns three times about the axis 34 during every two revolutions of the bit head.

The heel of the cone 31 is provided with a gage cutting surface 35, of frusto-conical shape, the lower portion of which rubs against the side wall of the bore hole. Preferably, the surface 35 is protected against wear by the usual rings of hard metal 36 deposited in two concentric grooves 37. The gage cutting surface 35 is separated from the heel row of teeth 32d by a smooth rim 38. The rim has a radius which is considerably shorter than that of the ground engaging crests of the adjacent teeth 32d and engages the earth formation at a higher level to ream the marginal area surrounding the area cut by the outermost teeth, as the rim rolls over the marginal area with a crushing action.

The cone 31 cooperates with two mating cones 39 and 41, both shown in phantom lines. The cone 41 has circumferential rows of teeth 42a, 42b and 42c arranged to cut annular areas on the bottom of the hole closely surrounding the annular areas cut by the teeth 32a, 32b and 32c respectively. Cone 41 also has a heel row of teeth 42d arranged to track the row 32d over the same area on the bottom of the hole. The teeth 42a, 42b, 42c and 42d are separated by circumferential grooves 43 similar in construction and purpose to the grooves 33 in cone 31. The cone 39 has circumferential rows of teeth 44a, 44b, 44c and 44d arranged to cut annular areas on the bottom of the hole closely surrounded by the annular areas cut by rows 32a, 32b, 32c and 32d respectively. Rows 44b, 44c and 44d cut annular areas closely surrounding the areas cut by rows 42a, 42b and 42c respectively. The teeth 44a, 44b, 44c and 44d are separated by circumferential grooves 45 similar to the grooves 33 and 43 in the other two cones. Cone 39 has a heel row of teeth 44e arranged to track the heel rows 32d and 42d. The heel row 44e is not separated from the adjacent row 44d by a circumferential groove, as in the case of the other two cutters, because the annular path cut by row 44e overlaps the path of row 44d. In order to bring the two paths close together they are provided with the same number of teeth in each row and the teeth are circumferentially staggered as shown in phantom lines in FIG. 1. Except for the two outermost rows on cone 39 and on cone 41, the number of teeth in each row varies from row to row on each cone almost in proportion to the diameter of the row, with the result that the teeth are all of approximately the same size. As far as practicable, the teeth in one row are staggered relative to those in another row on the same cone so that the teeth are not lined up radially (except in one position) and engage the earth formation with only one tooth per cone pointed directly downward at any precise instant. This concentrates the weight of the rock bit and superstructure on a few teeth and increases the penetration of the teeth while at the same time causing the cones to roll over the bottom of the hole more smoothly. To obtain the maximum staggering effect from row to row on the same cone the numbers of teeth in a row are so chosen that they are not multiplied. For example, the number of teeth in rows 32a, 32b, 32c and 32d is seven, fifteen, twenty-one and twenty-three respectively. In the cone 39, the number of teeth per row is five, twelve, twenty, fourteen and fourteen respectively. In cone 41 the numbers are nine, seventeen, twenty-five and twenty-five respectively. The two rows last referred to (42c and 42d) are circumferentially offset or staggered as in the case of rows 44d and 44e, but are separated by a relatively narrow one of the circumferential grooves 43.

As indicated previously, the outermost rows of teeth 32d, 42d and 44e are so located that they track each other over the same annular area on the bottom of the bore hole, such area being spaced slightly from the cylindrical wall of the hole, leaving a thin marginal area to be removed by the smooth rim 38. The remaining rows in the three cones are all arranged in non-tracking relation to each other being disposed at different radial distances from the center of the hole. The reason for radially staggering the rows of teeth is twofold; first, to cover substantially the entire area at the bottom of the hole with a minimum of teeth and, therefore, a greater concentration of load per tooth; and second, to obtain a self-cleaning effect.

As shown in FIG. 1, the row 42a on cone 41 projects into the circumferential groove 33 between rows of teeth 32a and 32b on cone 31, while conversely, the teeth 32b project into the circumferential groove 43 between rows 44b and 44c. Inasmuch as the adjacent teeth of the two cones are travelling in opposite directions, the interfitting of the teeth within the grooves has the effect of cleaning out any mud or detritus packed in the circumferential grooves. In this manner, each of the cones has an interfitting relation and a self-cleaning action with respect to each of the other two cones.

In accordance with this invention, each of the teeth has a novel shape designed to operate with a crushing action in hard formations and with a penetrating action in medium formations, without sacrificing the advantage of the self-cleaning action. Referring particularly to FIGS. 5–8, the tooth 32a, for example, has a blunt tip 47 in the shape of a hemisphere and has a root 48 below the tip, the root having the shape of a frustum of a cone except at the base where it is connected to a rounded surface or fillet 49. The fillet has the shape of a sector of a torus and provides a smooth surface transition between the frusto-conical surface of the root and a flat base 51 which lies in a plane perpendicular to the axis of the conical root. The flat base, as shown in FIGS. 5, 6, 16, 19 and 22, extends around the root 48 adjacent the bottom of the circumferential groove or grooves 33 and at the bottom of the radial grooves 52 which separate the teeth in the same circumferential row. As will be described later, the flat bases 51 are formed by milling the annular lands 53 (FIGS. 5, 19, 22) which lie between the circumferential grooves 33, until the flat base 51 lies almost flush with the bottom of the circumferential groove leaving very little metal left in the annular lands, outside of the teeth themselves. This arrangement is a departure from the usual practice of allowing the land to extend continuously around the cone cutter over a substantial radial depth measured from the bottoms of the teeth (or radial grooves) and the bottoms of the circumferential grooves.

Figure 6:
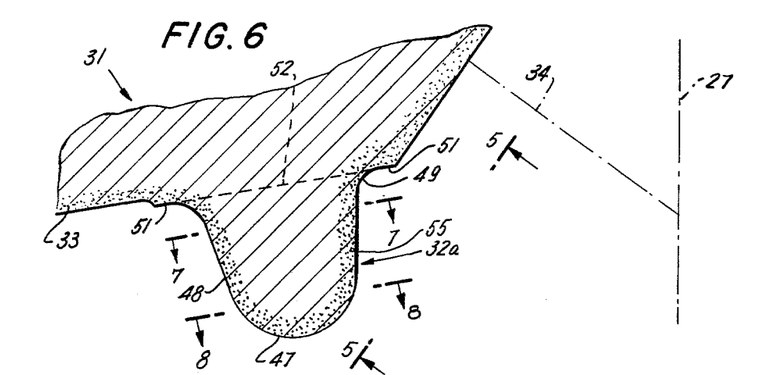
FIG. 6 is an enlarged longitudinal section of the tip portion of the cone cutter taken on the line 6—6 of FIG. 5.
Figure 7:
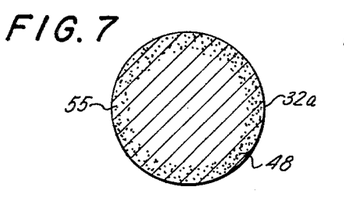
FIG. 7 is a cross section taken on the line 7—7 of FIG. 6 showing the circular root portion of one of the cone cutter teeth.
Figure 8:
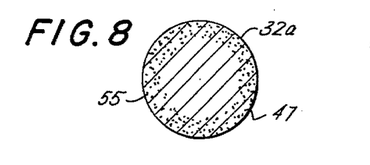
FIG. 8 is a cross section of the same tooth taken on the line 8—8 of FIG. 6 showing the circular tip portion.
Figure 9:
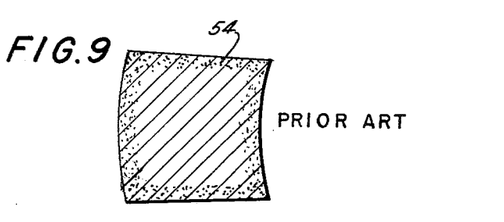
FIG. 9 is a view similar to FIG. 7 but showing the quadrilateral cross section of the root in a tooth of the type shown in Coulter Patent 2,927,778.
Figure 10:
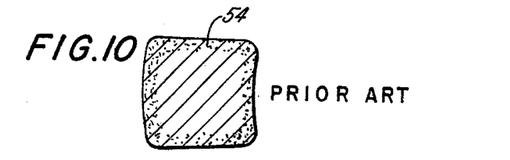
FIG. 10 is a view similar to FIG. 8 but showing the approximately quadrilateral section of the tip in a tooth of the type shown in the Coulter patent aforesaid.

The altitude of the root 48 is considerably greater than that of the tip 47, the latter being equal to the radius of curvature. The tooth 32a is circular in every plane of cross section, including the root portion 48 as shown in FIG. 7 and the tip portion 47 as shown in FIG. 8. In this respect, it differs from the tooth 54 of the type disclosed in Coulter Patent 2,927,778 which has a quadrilateral cross-section with sharp corners in the root, as shown in FIG. 9, and an approximately square cross section with rounded corners in the tip as shown in FIG. 10. It differs even more from the conventional chisel tooth which has a root of quadrilateral cross section and a tip of rectangular cross-section, both sections being characterized by sharp corners in any plane of longitudinal section, for example, in FIG. 6, the tooth 32a is delineated by a semicircle (representing tip 47), two straight lines tangent to the semi-circle and diverging therefrom and two arcs (representing the fillet 49) which are tangent to the base ends of the diverging lines and also to the perpendicular line (representing the flat base 51). This arrangement eliminates any sharp edges on the surface of the cone cutter 31 and particularly on the teeth. As shown in FIG. 6, the sides of the root 48 taper at an acute angle, for example with an included angle of twenty degrees (20°) so that the cross-sectional area of the root changes only very gradually from one level to the next, whereas the cross section of the blunt tip 47 changes abruptly. This construction enables the teeth to penetrate more easily into the earth formation after they have progressed beyond the altitude of the tip 47.

Figures 17, 18, 19, 20, 21, 22:
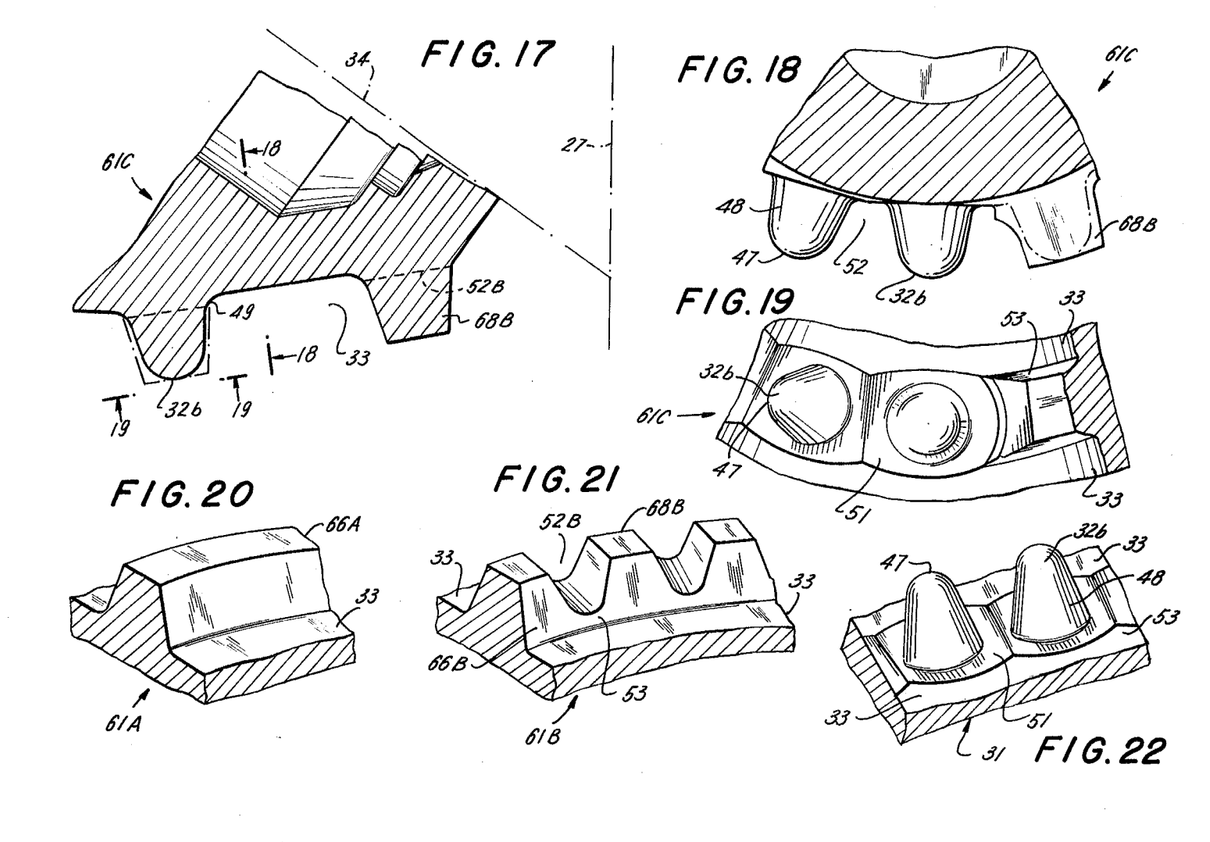
FIG. 17 is a fragmentary longitudinal section of a partly manufactured cone or workpiece, showing the innermost row of teeth at the end of the second step of manufacture and another row of teeth some of which are at the end of the third step.
FIG. 18 is a fragmentary cross section along the line 18—18 of FIG. 17, the right side of the row being at the end of the second step and the center and left side of the row being at the end of the third step of manufacture.
FIG. 19 is a bottom view of the fragment shown in FIG. 18, looking upward as indicated by the arrows 19 in FIG. 17.
FIG. 20 is a perspective view of a portion of a row of teeth at the end of the first step of manufacture.
FIG. 21 is a perspective view of a portion of a row of teeth at the end of the second step of manufacture.
FIG. 22 is a perspective view of a portion of a row of teeth at the end of the third step in the manufacturing process.

The remaining teeth on the three cones have substantially the same shape as the teeth 32a including the tip 47, root 48, fillet 49 and flat base 51. The axis of each tooth is inclined relative to the spindle axis 34 so that it extends approximately downward when in contact with the bottom of the hole as shown in FIGS. 1, 6 and 17.

In order to prolong the life of the teeth and the smooth rim 38, the surface of each cone 31, 39 or 41 is carburized and heat treated, by means to be described later, to provide a case hardened skin 55 (FIGS. 1, 6, 7, 8). Such carburization is carried to a further degree and to a further depth of case as compared with standard practice. This is made possible by the unusual shape of the teeth which are devoid of sharp corners or weak areas which otherwise might be incompatible with a deep case.

In operation, the bit head 25 is revolved about its vertical axis 27 carrying with it the cones 31, 39 and 41 which roll over the bottom of the bore hole, each about its individual axis with an approximate true rolling motion. Due to the wide circumferential grooves and the staggering of the teeth in one circumferential row out of radial alignment with the teeth in other rows on the same cone there are only a few teeth in contact with the bottom of the hole at any one time. Assume that the earth formation is extremely hard and abrasive so that it could not be cut by the conventional chisel tooth. The drill is turned at a relatively slow rate, say thirty revolutions per minute under tremendous pressure which may run as high as 100,000 pounds in a bit of the 8¾" size. This weight is concentrated upon a few minute areas at the bottom of the bore hole represented by the tangency between the bottom of the hole and the hemispherical tips 47. The effect is to fracture the hard rock at the bottom of the bore hole with a crushing action, thus dislodging small particles of detritus which are carried to the surface of the hole by the action of the flushing fluid discharged through suitable ports 56 in the bit head. The crushing pressure on the rock has its counterpart in a reactive force which tends to crush the teeth but such pressure is resisted by the arch-like construction of the teeth, which gives them great compressive strength. At the same time, abrasion on the teeth is resisted by the relatively deep hardened case 55 thus prolonging the life of the cutters.

As will be apparent from FIG. 1, the circumferential rows of teeth 32 (a, b, c) on cone 31; 42 (a, b, c) on cone 41 and 44 (a, b, c, d) on cone 39 are offset and spaced radially of the bore hole so that each cuts a separate annular area at the bottom of the hole, such areas being discrete and separated by annular spaces which are not in direct contact with the cutters. Such annular spaces, however, are broken away due to the fact that the action of the teeth on the rock formation is of an explosive nature with the fracturing force being transmitted laterally as well as downward on the rock.

The heel rows of teeth 32d, 42d and 44e roll over a common annular area near the side wall of the bore hole. These teeth, however, are spaced from the side wall of the bore hole by about 1/16" leaving a thin marginal area which provides an open space to receive cuttings. This area is cut by the smooth rims 38, each of which acts as a reamer to shave the side of the hole. Since the teeth in the heel rows 32d, 42d and 44e do not at any time directly engage the side wall of the bore hole, the wearing of the teeth in use will not affect the gage of the hole which is maintained by the tungsten carbide or hard facing 36 applied to the heel surface 35 of the cone.

Assume now that the rock bit when only slightly worn reaches the end of the layer of extremely hard and abrasive formation and meets a relatively softer formation such as a stringer of shale. Unlike the prior art hard formation bit of the inserted plug type, the rock bit of this invention need not be pulled out of the bore hole and replaced by a chisel toothed bit. Instead, it is permitted to continue to run, preferably at a higher speed but lower pressure. The cutter teeth of this invention, notwithstanding their blunt tips 47 will continue to drill without "balling up" because the root portion 48 provides sufficient length of tooth to permit them to penetrate deeply into the relatively soft earth formation.

Figure 3:
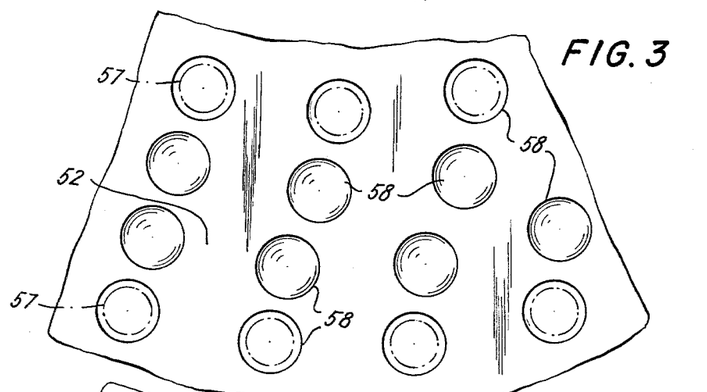
FIG. 3 is an enlarged fragmentary plan view of the bottom of the bore hole showing the location and shape of the indentations formed by the teeth of the three cone cutters.

Assuming that the rows of teeth 32b and 32c are rolling over a hard formation and that each tooth penetrates to a depth less than the altitude of the tip 47, the indentations on the bottom of the hole are in the shape of circles 57 shown in phantom lines in FIG. 3, each having a radius less than the altitude of the tip.

Assuming further that the drill bit encounters a relatively soft formation so that the penetration of the teeth extends beyond the altitude of the tips 47 and through a part of the altitude of the roots 48, the indentations 58 appear as large circles having a diameter corresponding to that of the root 47 at the penetration level. In either case, the action of the tooth is to form a concavity first of small diameter and depth and then to spread the diameter equally in all directions as the tooth penetrates and as the impression is enlarged to the size of the indentations 58, and later to an even larger diameter. As shown in FIG. 3, the indentations 58 are arranged in concentric circumferential rows formed by the rows of teeth 32b, 42b, 44c and 32c respectively. For purpose of comparison, the indentations produced by one tooth in each of those four rows are shown in radial alignment on the left side of FIG. 3, although that condition occurs very infrequently. The remaining indentations are not aligned radially due to the difference in the angle of circumferential spacing which causes the teeth to reach the lowermost position one at a time rather than in groups.

Figure 4:
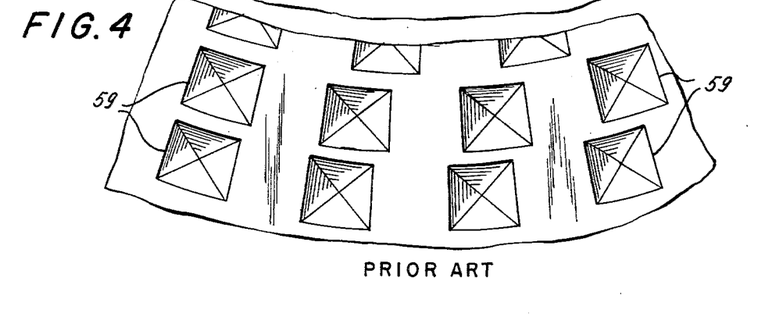
FIG. 4 is a view similar to FIG. 3 but showing the indentations produced by a comparable set of cone cutters of the prior art.
Figure 5:
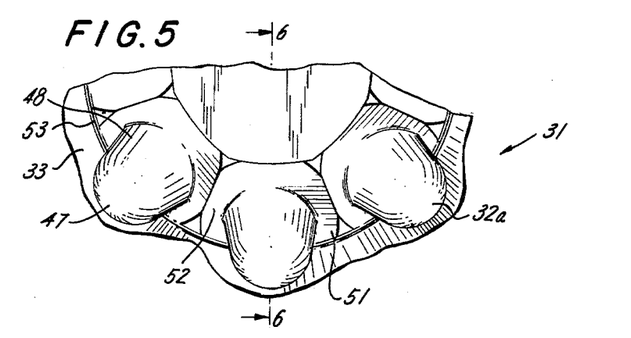
FIG. 5 is a fragmentary end view of the tip portion of the illustrated cone looking in the direction of the cone cutter axis as indicated by the arrows 5 in FIG. 1 and in FIG. 6.

FIG. 4 shows the indentations 59 formed on the bottom of the hole by a tooth of the prior art, which has a root of frusto-pyramidal shape, for example, the tooth 54 illustrated in FIGS. 9 and 10 which is like those shown in Coulter U.S. Patent 2,927,778 dated March 8, 1960. Viewed in plan, the indentations are approximately square or quadrilateral. As in the case of the present invention, the prior art tooth 54 first makes point contact and simultaneously enlarges the area and depth of the impression while the tooth pushes the earth formation down and simultaneously wedges it outward around the periphery of the indentations. However, the distribution of the wedging forces is different. With the present invention, the tooth enlarges the indentation from the small size 57 to the large size 58 (and to larger sizes) by exerting a wedging force which expands the sides uniformly in all directions. With the arrangement of the prior art, however, the pyramidal tooth 54 exerts a lateral wedging pressure with a greater force in some directions than in other directions. Thus the present invention is more effective in disintegrating the earth formation uniformly over the entire area at the bottom of the hole. The invention has a further advantage in that the reactive forces tending to cause wear and breakage of the teeth are distributed uniformly throughout the circumference of the root 48, whereas in the case of the usual prior art tooth, the forces acting inwardly on the pyramidal root are unevenly distributed. The increased strength of tooth resulting from the circular cross-section of the root makes it possible to increase the depth of case hardening without a corresponding increase in the liability of breakage. Increasing the depth of case prolongs the life of the teeth.

Still another advantage of the conical root 48 over the frusto-pyramidal root of the prior art is that it permits a reduction in the cross-sectional area without a corresponding loss of strength. This concentrates the weight of the rock bit and superstructure upon relatively minute areas on the bottom of the bore hole and increases penetration and drilling speed.

In another prior art arrangement, known as the inserted plug type and exemplified by Morlan U.S. Patent 2,687,875 dated August 31, 1954, the tooth is of circular cross section throughout its entire altitude and, therefore, the indentations on the bottom of the hole would be round as in the case of the impressions 57 produced by the teeth of the present invention. The operation of the inserted plug tooth is comparable (although not identical) to that of the present invention only up to the time that the tooth penetrates to the deph of the tip 47. Thereafter the plug can penetrate no farther because it does not have any root portion corresponding to present root 48. The frusto-conical root 48 produces a different action from the hemispherical tip 47 because it wedges laterally with a sharp acute angle causing only a relatively slight horizontal expansion of the diameter of the indentation 58 as compared with the depth of penetration. The force with which the sides are expanded is, therefore, much greater than it is in the case of a tooth which consists only of a hemisphere and no root.

Another advantage of the present invention over the inserted plug type of tooth is that the long root 48 provides an adequate clearance space above the level of the blunt tips 47 and below the surface on the main body of the conical cutter 31. This clearance space permits unobstructed passage of flushing fluid, which is discharged from jet openings 56 to the bottom of the hole and which then flows radially outward through the radial grooves 52.

Figure 11:
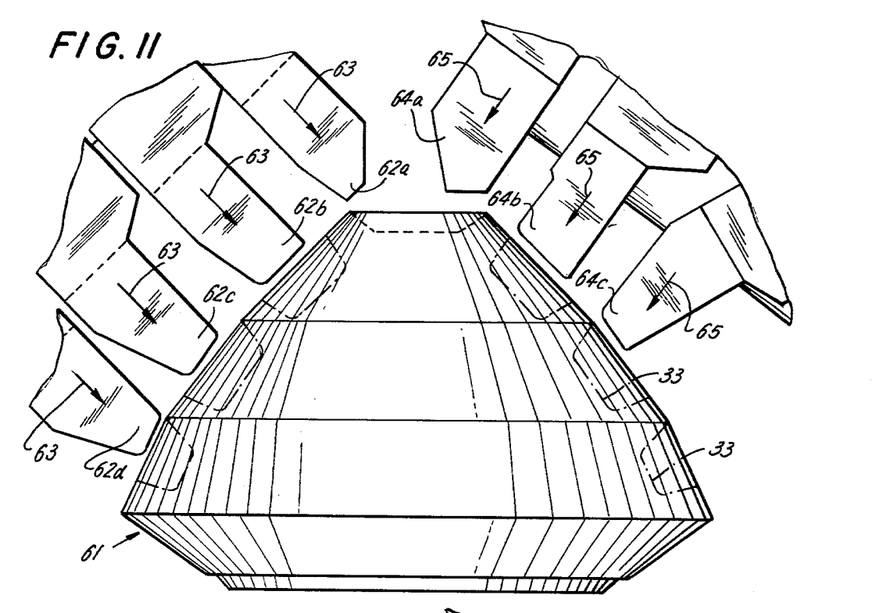
FIG. 11 is an elevational view of a cone cutter blank in association with the forming tool cutters, the arrows representing the direction of simultaneous movement of the latter toward the blank, and the phantom lines representing the metal which will be removed from the blank during the first step of manufacturing process.

The method of manufacturing the cone cutter 31 will now be described, it being understood that the same method is employed for making the other cones 39 and 41, except that the teeth are spaced differently. Referring to FIG. 11, the original workpiece or cone blank 61 is a plain steel forging having a smooth external surface comprising numerous segments, some of which are plane surfaces and others of which are frusto-conical. The workpiece is supported on a lathe spindle (not shown) for rotation about the axis of the frusto-conical surface portions. A set of sharp forming tools 62 (a, b, c, d) are arranged on the left side of the workpiece and are supported for simultaneous movement downward and inward in the direction of the arrows 63, said arrows being parallel to each other. The forming tools have cutting edges at the bottom and/or sides. A second set of sharp forming tools 64 (a, b, c) are arranged on the right side of the workpiece 61 and are supported for simultaneous movement downward and inward in the direction of the arrows 65, said arrows being parallel to each other. The workpiece 61 is rotated on its axis while each of the forming tools is gradually fed toward said axis, either one set at a time or preferably both sets simultaneously. The forming tools engage the surfaces of the workpiece along spaced annular areas and remove metal therefrom by a machining operation. The cutting edges of the two sets of forming tools are so constructed and arranged that collectively they delineate the shape of the side walls and bottoms of the circumferential grooves 33.

Figure 12:
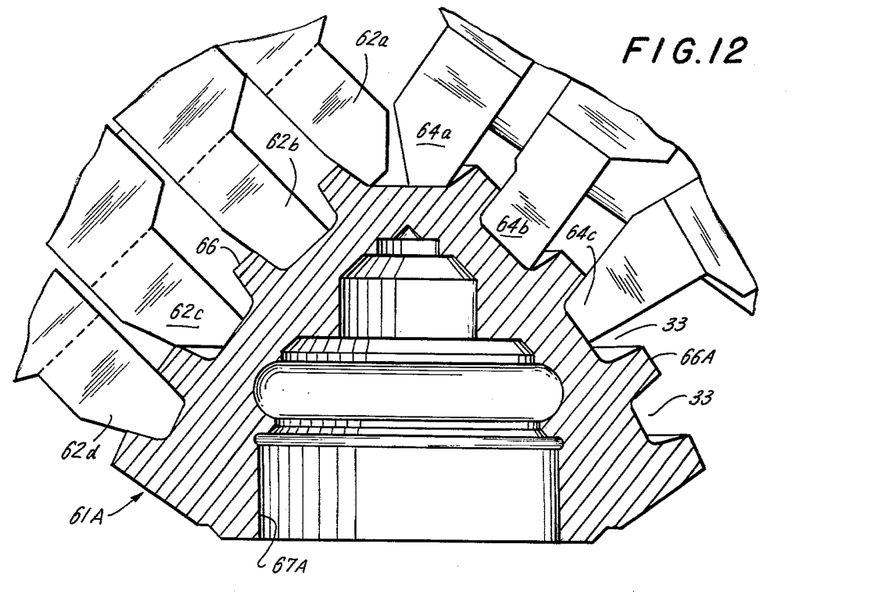
FIG. 12 is a longitudinal section of the cone cutter blank at the end of the first step of manufacture showing the forming tools in the position where they complete the cutting of the circumferential grooves.

FIG. 12 shows the workpiece 61A at the end of the first step in the manufacturing process, with the circumferential grooves 33 separated by circumferential ridges 66A. FIG. 12 also shows the workpiece provided with a bore 67A but it will be understood that the machining of the bore is not part of the present invention and may be effected either prior to, or subsequent to, the machining of the grooves 33 and teeth 32 on the surface of the workpiece.

At the end of the first step of manufacture, each circumferential ridge 66A has substantially the shape of a trapezoid of revolution as shown in FIGS. 12 and 20. The next step is to break up the ridge by forming radial grooves 52B extending transversely to the circumferential grooves 33. In the second step, these radial grooves are formed by a milling machine (not shown) or by using a shaper having a cutting tool arranged to reciprocate along a line which is co-planar with the cone axis 34 but extending oblique thereto. During this second step, the workpiece is arranged for indexing movement about the axis 34 upon completion of each individual radial groove 52B. The radial grooves are uniformly spaced circumferentially of each ridge and the indexing angle is determined by the number of teeth in the particular row. At the end of the second step in the process of manufacture, the workpiece 61B has a notched, or radially grooved, ridge 66B. As shown in FIG. 21, ridge 66B includes the annular land 53 previously described, and also a series of stubs 68B between the radial grooves 52B. The latter have the shape of a V, diverging from a concave bottom, with the result that the intervening stubs 68B have the shape of a frustum of a pyramid.

In the third step of manufacture, the stubs 67B are individually milled to form the teeth 32 (*a, b, c* or *d*). For purpose of illustration, the workpiece 61C is illustrated in FIGS. 13, 16, 17, 18 and 19 with the third step only partly completed, that is, with some, but not all, of the teeth milled to the final shape. The milling apparatus for individually shaping the teeth 32 is shown in FIGS. 13–16. It comprises an end mill 71 supported for rotation about an axis 72 which extends radially of the workpiece 61C and through the center of a selected one of the stubs 68B. The end mill is also arranged to reciprocate along the axis 72 toward and away from the workpiece. The axis 72 lies in the same plane as the cone axis 34 and at such an angle thereto that the teeth 32 will extend approximately vertically downward when in contact with the bottom of the bore hole as illustrated in FIG. 1. The end mill has a shaft 73 integrally connected to a head 74, the latter serving as a holder for a form tool 75. Near its top the mill head 74 has the cross sectional shape of a solid circle concentric to the shaft 73 and axis 72; but below the top portion the head is cut away to form a sector shaped recess 76 extending for more than 90° of the circumference of the head, but defined by vertical walls 77 and 78 which are at right angles to each other. One of these walls 77 extends radially and lies in the same plane as the axis of rotation 72 while the other wall 78 lies in a plane which is parallel to the head axis. The radial wall 77 is recessed to provide a vertical groove 79 of rectangular cross section, the inner end of which forms a continuation of wall 78. The form tool is detachably mounted in the groove 79 and has the same cross section as the groove throughout the major portion of the length of the tool so that the front face of tool 75 lies flush with the ungrooved portion of radial wall 77. The form tool 75 is insertable into and removable from the holder 74 through the lower end of the groove 79. In order to secure the form tool rigidly in the holder 74, the latter is provided with a pair of threaded openings 81 extending transverse to the groove 79, and the form tool is provided with a pair of holes 82 registering with the threaded openings. A pair of socket head cap screws 83 extend loosely through the holes 82 and into threaded engagement with the openings 81. The heads of the cap screws seat against the front face of the form tool 75 which is the leading face when the end mill is rotated in the direction of the arrow 84.

Figure 2:
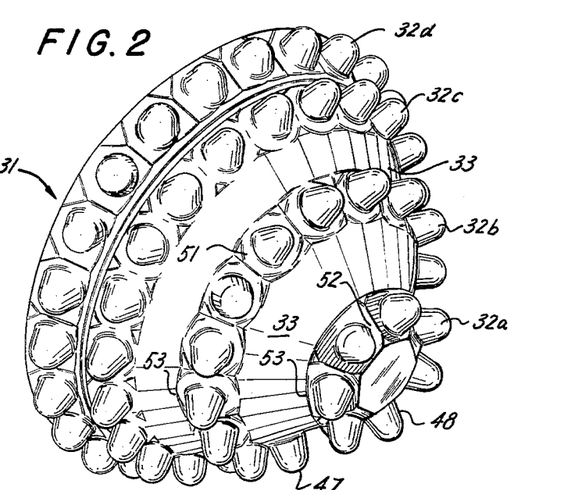
FIG. 2 is a perspective view of the illustrated cone.
Figures 13, 14, 15, 16:
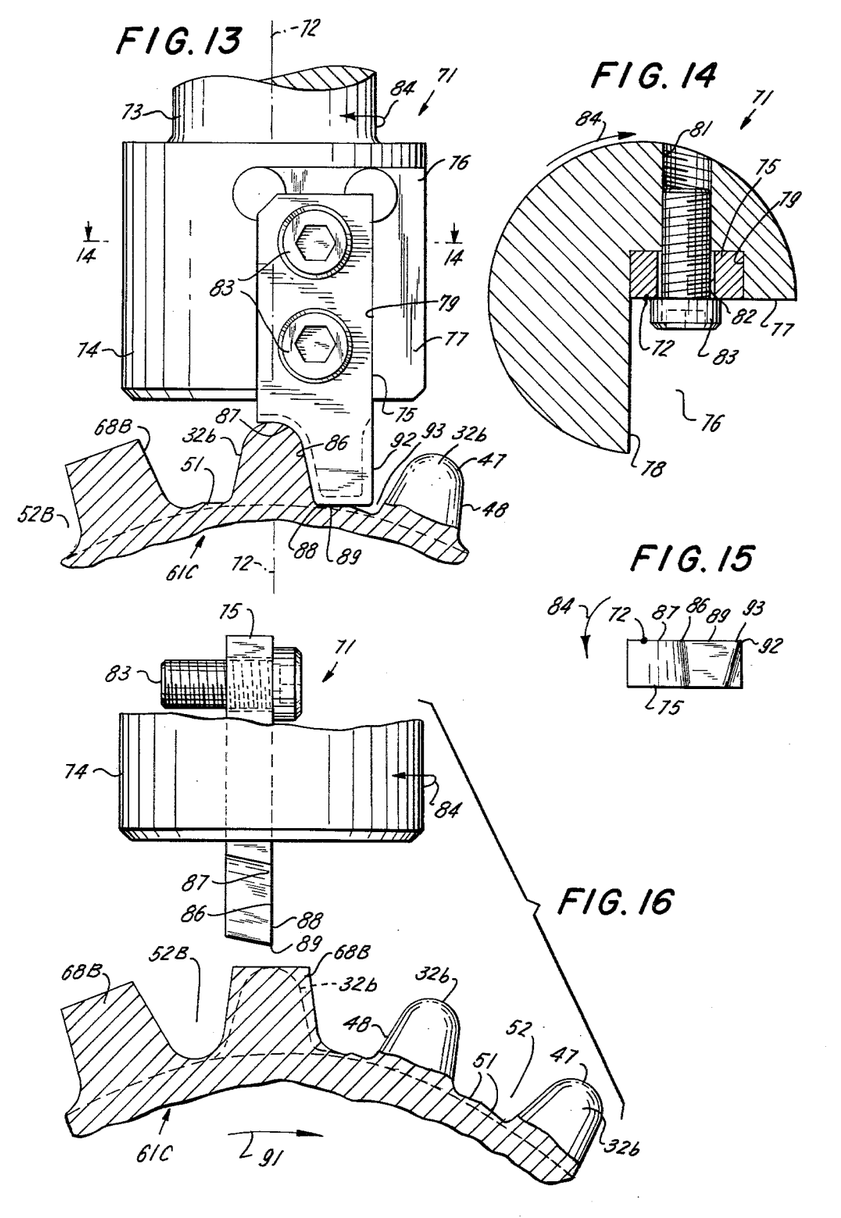
FIG. 13 is an enlarged cross section of a fragmentary part of a row of teeth, the left side of the fragment being at the end of the second step in the process of manufacture with radial grooves formed therein, and the right side of the fragment being at the end of the third step of manufacture with the teeth milled to a circular cross sectional shape, the milling apparatus being shown at the completion of the third step of manufacture of one of the teeth.
FIG. 14 is a cross section of the milling apparatus along the line 14—14 of FIG. 13.
FIG. 15 is an elevational view of the inner end of the cutting blade or form tool in the milling apparatus, the arrow representing the direction of rotation.
FIG. 16 is a view similar to FIG. 13 showing the milling apparatus removed from the cone blank and the latter indexed to a new position in which the milling tool registers with a tooth of quadrilateral cross section, said tooth being at the end of the second step of manufacture.

Referring to FIG. 13, the lower inner corner of the front face of the form tool 75 has a cutting edge which conforms in contour with a half longitudinal section of the tooth 32*a*. Accordingly, the cutting edge comprises a straight portion 86 tapering upward at an angle of 10° relative to the axis of rotation 72, the straight portion being tangent to a curved portion 87. The radius of curvature of the latter conforms with that of the hemispherical tip 47 and is equal to the altitude of the tip of the tooth 32*a*. At the lower end of the straight portion 86, the cutting edge has a chamfer portion 88 conforming in radius with the fillet 49 shown in FIG. 6. Extending tangentially from the chamfer 88 and along the bottom edge of the front face of the form tool 75, the cutting edge has a straight portion 89 arranged to mill the plane surface 51 which surrounds the base of the tooth 32*b* as shown in FIG. 2.

In the operation of the end mill 71, the mill is aligned with one of the stubs 68B, as previously described, and as illustrated in FIG. 16. With the workpiece 61C held stationary, the end mill simultaneously rotates in the direction of the arrow 84 and advances along its axis 72 in the direction of the workpiece. Initial contact between the form tool 75 and the workpiece occurs when the chamfer portion 88 of the cutting edge engages the upper edges of the stub 68B. Thereupon, the edges of the stub are milled away to reduce the cross section gradually from a quadrilateral to a circle, starting at the top of the stub and progressing downward until the parts attain the position shown in FIG. 13 when all of the cutting edge portions 86, 87, 88, 89 are engaged with the workpiece and the tooth 32*b* is completely formed with a circular cross section in every plane as previously described. The end mill 71 is then withdrawn along its axis 72 back to the position of FIG. 16 and is held out of contact with the workpiece 61C for a sufficient interval of time to permit repositioning of the latter.

The workpiece 61C is then indexed by rotating it about its axis 34 in the direction of the arrow 91 until the next stub 68B is aligned with the end mill and the operation is repeated. Preferably, the end mill 71 rotates continuously during the formation of an entire circumferential row of teeth, and the reciprocating movements of the mill and the indexing motions of the workpiece are controlled automatically. Automatic machine tools adapted to impart intermittent indexing movements to a rock bit cone, and to reciprocate a tool toward and away from the cone surface, are well known in the art, as exemplified by Evans Patent 1,922,424 granted August 15, 1933. After an entire row of teeth has been completed, the workpiece 61C is removed from the spindle (not shown) on which it is supported and indexed and is replaced by a succeeding workpiece. The latter usually conforms with the one it replaced in all respects and, therefore, is intended to be used as a corresponding cone to be assembled in a different bit head 25. The use of a single end mill for forming a single row of teeth on a single one of the three cones of any head has the advantage of saving time as the cone workpieces are replaced in rapid succession without requiring any adjustment of the position of the end mill.

In some instances, the end mills are used for producing only a relatively small quantity of rock bits of a particular size. In that case, it is not economical to employ a separate end mill for each row of teeth on all three cones. In order to adapt the same end mill 71 for cutting a different row on the same cone, or a row on another cone, the end mill axis 72 is repositioned relative to the cutter axis 34 so that the teeth will have the location and angularity shown in FIG. 1. The indexing angle for the workpiece is also adjusted correspondingly, it being understood that the teeth in any one row are uniformly spaced and therefore the indexing angle is equal to 360° divided by the number of teeth in the row. In case the end mill 71 is shifted to a row of stubs intended to be shaped as teeth of a different size from the teeth previously milled, the form tool 75 is removed from the holder 74 and replaced by another form tool of the desired size and shape. The socket head cap screws 83 permit ready removal and replacement of the form tools.

Preferably, the straight radial portion 89 of the cutting edge is extended along the entire length of the bottom edge of the front face of the form tool 75, and a vertical cutting edge 92 is provided along the lower right side of the front face of the form tool 75, the vertical edge being connected to the bottom edge portion 89 by means of a chamfer 93. In the use of the method illustrated in FIGS. 13 and 16, no function is performed by the vertical edge 92, chamfer 93 or the outer half of the bottom edge 89. However, these edges may be used in a modified process in which the second step is eliminated, that is, for milling the teeth 32*b* in a row such as shown in FIG. 20 without the step of cutting the groove 52B shown in FIG. 21. The structure resulting from the elimination of the second step is substantially the same as that of the completed cone 31 inasmuch as the added cutting edges 92, 93 and part of 89 perform (by a milling operation) the function of the tool used for cutting the radial grooves 52B in the method first described. In commercial production, it has been found preferable to utilize the second step as illustrated in FIG. 21 because the elimination of this step would cause excessive wear on the form tools 75 and also require a longer interval of time for the latter to remove a large quantity of metal around the tooth 32b.

After the machining operations on the cone 31 (39 or 41) have been completed, the steel cone is carburized to produce a case or skin 55 for a depth of .105″ or .110″. For this purpose, the cone is heated to a temperature of 1750° F. in a suitable atmosphere such as gaseous hydro-carbon or carbon monoxide and for such period of time until the carbon content of the steel is raised to about 0.85% at the surface and to about 0.80% at a depth of .04″. After the desired carbon concentration is obtained in the skin 55, the cone 31 is quenched in oil at a temperature of 1650° F. The cone is then reheated to a temperature of 1450° F. in a second furnace which is arranged with two compartments through which the cone passes. In the first compartment the carbon content of the case 55 is reduced so that the percentage of carbon is .80% at a depth of only .010″. Later in the second compartment the carbon content of the case is increased to 0.88% at a depth of .010″. After leaving the second furnace, the cone is permitted to cool slowly. This process of carburizing results in a considerable number of very small spheroidized carbides from the cone surface to a depth of about .010″ with a consequent highly wear resistant surface. The total depth of case, namely .105″ or .110″ is beyond the limit usually considered safe for conventional cones. Due to the shape of the teeth 32b, which are free from any sharp corners and which avoid any concentration of stresses, the hard case 55 does not result in any fracture, breakage or chipping of the teeth.

What is claimed is:
1. A rock bit comprising a bit head having a plurality of roller cones mounted thereon for rotation about individual axes extending downwardly and inwardly, said cones having teeth arranged in circumferential rows and said teeth having conically shaped root portions projecting from the roller cone surface, and having hemispherical tips merging with said root portions.

2. A rock bit comprising a bit head having a plurality of roller cones mounted thereon for rotation about individual axes extending downwardly and inwardly, said cones having teeth arranged in circumferential rows, each tooth having a tip and a root, characterized in that the root is of circular cross section, and the tooth in longitudinal section has the shape of a semi-circle with two straight sides diverging therefrom in tangential relation to the semi-circle.

3. In a rock bit, a roller cone having a plurality of teeth, all of approximately the same size, each tooth having a convex tip and having an exposed root of greater altitude than the tip, the tip being of approximately hemispherical shape and the root being of approximately frusto-conical shape.

4. In a rock bit, a roller cone having a plurality of teeth all integral with the main body of the cone, each tooth having an ovoid tip and a frusto-conical root, the body of the cone having a flat base which surrounds the root and lies in a plane at right angles to the axis of the root, said flat base being joined to the adjacent portion of the root by a fillet, the surface of the fillet forming a sector of a torus coaxial with the root, the surface of the teeth and cone body being smooth and devoid of sharp corners, said surface being case hardened.

5. In a rotary drill bit having three cones with their cutting areas converging toward the central axis of the bit and mounted to contact the bottom of the hole with an approximate true rolling motion: cutting teeth formed on said cones in circumferential rows separated by circumferential grooves, each of said teeth having a root portion and a tip portion, the rows of teeth on each cone being offset relative to the teeth on the other cones and adapted to interfit therewith, the tip portion of each tooth extending into the groove between the rows of teeth on the adjacent portions of each of the other cones to provide a self-cleaning action, the root portions of the teeth in each row being separated by radial grooves adapted to provide deep penetration of the teeth into the earth formation; characterized in that the root portions are of frusto-conical shape and each tooth is circular in every plane of cross section.

6. A rotary drill bit according to claim 5, in which the radial grooves have a depth substantially equal to the depth of the circumferential grooves, and in which each tooth is surrounded by a flat base, said flat base being connected to the sides of the root portions of the teeth and to the bottoms of the circumferential grooves by means of smooth continuous surfaces devoid of sharp corners.

7. An earth boring drill according to claim 5, in which all of the teeth on all three cones are of substantially the same size and shape.

References Cited by the Examiner
UNITED STATES PATENTS

| | | | |
|---|---|---|---|
| 2,121,202 | 6/1938 | Killgore | 175—374 |
| 2,129,417 | 9/1938 | Gase | 29—103.1 |
| 2,377,329 | 6/1945 | Dettmer | 29—103.1 |
| 2,388,108 | 10/1945 | Zublin | 76—108 |
| 2,774,570 | 12/1956 | Cunningham | 175—374 |
| 2,774,571 | 12/1956 | Morland | 175—341 |
| 2,927,778 | 3/1960 | Coulter | 175—341 |
| 2,939,684 | 6/1960 | Payne | 175—375 |
| 3,003,370 | 10/1961 | Coulter | 75—108 |
| 3,137,355 | 6/1964 | Schumacher | 175—374 |

CHARLES E. O'CONNELL, *Primary Examiner.*
BENJAMIN BENDETT, *Examiner.*